(12) United States Patent
Nakagawa

(10) Patent No.: US 10,564,046 B2
(45) Date of Patent: Feb. 18, 2020

(54) INTERNAL TEMPERATURE MEASURING APPARATUS AND TEMPERATURE DIFFERENCE MEASURING MODULE

(71) Applicant: OMRON Corporation, Kyoto-shi, Kyoto (JP)

(72) Inventor: Shinya Nakagawa, Omihachiman (JP)

(73) Assignee: OMRON Corporation, Kyoto-shi (JP)

(*) Notice: Subject to any disclaimer, the term of this patent is extended or adjusted under 35 U.S.C. 154(b) by 310 days.

(21) Appl. No.: 15/679,609

(22) Filed: Aug. 17, 2017

(65) Prior Publication Data

US 2017/0343422 A1 Nov. 30, 2017

Related U.S. Application Data

(63) Continuation of application No. PCT/JP2016/055551, filed on Feb. 25, 2016.

(30) Foreign Application Priority Data

Mar. 12, 2015 (JP) .................................. 2015-049708

(51) Int. Cl.
*G01K 7/02* (2006.01)
*G01K 7/01* (2006.01)

(52) U.S. Cl.
CPC ............... *G01K 7/028* (2013.01); *G01K 7/01* (2013.01); *G01K 7/021* (2013.01); *G01K 7/025* (2013.01)

(58) Field of Classification Search
CPC .......... G01K 7/02; G01K 7/028; G01K 17/00; G01K 7/226; G01K 7/00; G01K 13/00; G01K 7/06; H01L 35/00; H01L 35/32

(Continued)

(56) References Cited

U.S. PATENT DOCUMENTS 7,875,791 B2 * 1/2011 Leonov .................... G01J 5/12
                                                136/203
9,117,949 B2 * 8/2015 Mao ....................... G01J 5/022

(Continued)

FOREIGN PATENT DOCUMENTS

JP    2007-212407 A    8/2007
WO    2013/141153 A1   9/2013

OTHER PUBLICATIONS

International Search Report of PCT/JP2016/055551 dated Mar. 22, 2016.

(Continued)

*Primary Examiner* — Gail Kaplan Verbitsky
(74) *Attorney, Agent, or Firm* — Metrolex IP Law Group, PLLC

(57) ABSTRACT

An internal temperature measuring apparatus includes a base and a MEMS device disposed on the base. The MEMS device includes a top face and a support. The top face includes a first thermopile configured to measure a first temperature difference used to calculate an internal temperature and a second thermopile configured to measure a second temperature difference used to calculate the internal temperature together with the first temperature difference. An orientation in which a cold junction of each thermocouple constituting the first thermopile is viewed from a hot junction coincides with an orientation in which a cold junction of each thermocouple constituting the second thermopile is viewed from a hot junction.

4 Claims, 7 Drawing Sheets

(58) Field of Classification Search
USPC ............ 374/29, 30, 135, 141, 170, 179, 208
See application file for complete search history.

(56) References Cited

U.S. PATENT DOCUMENTS

| | | | | |
|---|---|---|---|---|
| 9,513,240 | B2* | 12/2016 | Lin | G01N 25/4893 |
| 9,976,916 | B2* | 5/2018 | Fuleki | G01K 13/028 |
| 10,018,510 | B2* | 7/2018 | Schilz | G08B 13/193 |
| 10,190,921 | B2* | 1/2019 | Nakagawa | A61B 5/01 |
| 10,295,490 | B2* | 5/2019 | Jia | G01K 17/006 |
| 2004/0113076 | A1* | 6/2004 | Guo | G01H 11/08 |
| | | | | 250/338.1 |
| 2004/0187904 | A1* | 9/2004 | Krellner | G01J 5/10 |
| | | | | 136/213 |
| 2008/0262773 | A1 | 10/2008 | Howell | |
| 2009/0206264 | A1* | 8/2009 | Twiney | G01J 5/041 |
| | | | | 250/353 |
| 2015/0010040 | A1 | 1/2015 | Ito et al. | |
| 2017/0038235 | A1* | 2/2017 | Zhao | G01F 1/6845 |
| 2017/0038237 | A1* | 2/2017 | Chen | E21B 43/34 |
| 2017/0147879 | A1* | 5/2017 | Alameh | G06F 1/1684 |
| 2017/0219428 | A1* | 8/2017 | Hasegawa | G01W 1/12 |
| 2017/0307553 | A1* | 10/2017 | Jia | G01K 17/006 |
| 2018/0072563 | A1* | 3/2018 | Huang | B81B 7/0067 |
| 2018/0106681 | A1* | 4/2018 | Buydens | G01J 5/0003 |
| 2019/0148424 | A1* | 5/2019 | Kropelnicki | G01J 5/048 |
| | | | | 257/293 |

OTHER PUBLICATIONS

English translation of Written Opinion of PCT/JP2016/055551 dated Mar. 22, 2016 from the International Searching Authority.

* cited by examiner

INTERNAL TEMPERATURE MEASURING APPARATUS AND TEMPERATURE DIFFERENCE MEASURING MODULE

CROSS REFERENCE TO RELATED APPLICATIONS

This application is a continuation application of International Application No. PCT/JP2016/055551, filed on Feb. 25, 2016, which claims priority based on the Article 8 of Patent Cooperation Treaty from prior Japanese Patent Application No. 2015-049708, filed on Mar. 12, 2015, the entire contents of which are incorporated herein by reference.

TECHNICAL FIELD

The disclosure relates to an internal temperature measuring apparatus and a temperature difference measuring module.

BACKGROUND ART

A sensor module having a configuration in FIG. 10 (for example, see Patent Document 1) is known as one that can measure a core body temperature Tb without being affected by an individual difference in heat resistance Rx of a subcutaneous tissue.

The following two equations hold in the sensor module.

$$Tb = (Tt - Ta)Rx/R1 + Tt \quad (1)$$

$$Tb = (Tt' - Ta')Rx/R2 + Tt' \quad (2)$$

Where Ta and Ta' are temperatures measured with temperature sensors on top surface sides of heat flux sensors on the left and right in FIG. 10, respectively. Tt and Tt' are temperatures measured with temperature sensors on bottom surface sides of heat flux sensors on the left and right in FIG. 10, respectively. R1 and R2 are heat resistances of heat insulators of the heat flux sensors.

The following equation (3) can be obtained when the heat resistance Rx is eliminated by a combination of the equations (1), (2).

[Mathematical Formula 1]

$$Tb = \frac{R2(Tt - Ta)Tt' - R1(Tt' - Ta')Tt}{R2(Tt - Ta) - R1(Tt' - Ta')} \quad (3)$$

Accordingly, in the sensor module of FIG. 10, the core body temperature Tb can be calculated without being affected by the individual difference of the heat resistance Rx of the subcutaneous tissue.

PRIOR ART DOCUMENT

Patent Document

Patent Document 1: Japanese Unexamined Patent Publication No. 2007-212407

SUMMARY OF THE INVENTION

Problems to be Solved by the Invention

The sensor module obtains information necessary for the calculation of the core body temperature Tb using plural temperature sensors. Accuracy of the temperature sensor is not very high. Therefore, a heat insulator having a large heat resistance and a large heat capacity is used in the sensor module. Resultantly, the sensor module has poor responsiveness (a long time is required to obtain a stable measurement result of the core body temperature).

When the MEMS chip including the thermopile is used to measure the temperature difference, the heat resistance and heat capacity of the sensor module that measures the core body temperature decrease largely, which allows the core body temperature to be measured with good responsiveness. However, because the MEMS chip is an extremely small device (2 mm to 3 mm square or less), the use of the MEMS chip tends to easily generate an estimated error in an internal temperature by an influence of a heat flow from a heat source except for a measurement object.

One or more embodiments may provide an internal temperature measuring apparatus and a temperature difference measuring module, which are hardly affected by the heat flow from the heat source except for the measurement object.

Means for Solving the Problem

According to one or more embodiments, an internal temperature measuring apparatus that measures an internal temperature of a measurement object, the internal temperature measuring apparatus includes: a base in which one of surfaces of the base is brought into contact with a surface of the measurement object during calculation of the internal temperature of the measurement object; and a MEMS device disposed on the other surface of the base to a first temperature difference and a second temperature difference, the first temperature difference and the second temperature difference being used to calculate the internal temperature of the measurement object, the MEMS device including a top face and a support, the top face including a first thermopile configured to measure the first temperature difference and a second thermopile configured to measure the second temperature difference, the support supporting the top face, at least one cavity leading to the top face being provided in the support, an orientation in which a cold junction of each thermocouple constituting the first thermopile is viewed from a hot junction coincides with an orientation in which a cold junction of each thermocouple constituting the second thermopile is viewed from a hot junction.

The thermopile is susceptible to a temperature gradient in a direction parallel to a temperature difference measuring direction (a length direction of each thermocouple of the thermopile) of the thermopile. In the case that the temperature gradient is generated in the direction parallel to the temperature difference measuring direction in the MEMS device including the plural thermopiles in which the temperature difference measuring directions are identical, output of the thermopile oriented toward the direction in which the temperature gradient is raised in viewing the cold junction of each thermocouple from the hot junction decreases, and output of the thermopile oriented toward an opposite direction to the direction in which the temperature gradient is raised in viewing the cold junction of each thermocouple from the hot junction increases. Therefore, the estimated error increases in the case that the internal temperature is calculated from the outputs of the two thermopiles oriented toward the different directions in viewing the cold junction of each thermocouple from the hot junction. However, the estimated error can be decreased when the configuration of the internal temperature measuring apparatus of one or more embodiments is adopted (the configuration in which the internal temperature is calculated from the outputs of the two thermopiles oriented toward the identical direction in viewing the cold junction of each thermocouple from the hot junction). Accordingly, the internal temperature measuring apparatus of one or more embodiments acts as the apparatus that is hardly susceptible to the heat flow from the heat source except for the measurement object.

The base of the internal temperature measuring apparatus may be a single member (such as a printed wiring board) or a member in which plural members are combined. A MEMS device including plural first thermopiles and plural second thermopiles may be used as the internal temperature measuring apparatus.

The internal temperature measuring apparatus may further include: a printed circuit board including an arithmetic circuit configured to calculate the internal temperature using the first and second temperature differences measured with the MEMS device; and a package having a bottomed tubular shape including plural leads. The package is inserted in a through-hole made in the printed circuit board, and the base is a bottom of the package. As used herein, the package having a bottomed tubular shape means a package including a bottom having a bottomed c shape, a bottomed elliptical tube shape, a bottomed rectangular tube shape, and the like and a sidewall surrounding the bottom.

In the internal temperature measuring apparatus, in order to improve the accuracy of the measurement in the internal temperature, the bottom of the package may include two high heat conductive units made of a first material having good heat conductivity, the two high heat conductive units being separated from each other using a material having heat conductivity lower than that of the first material, and the hot junction of each thermocouple of the first thermopile may be located above one of the two high heat conductive units while the hot junction of each thermocouple of the second thermopile is located above the other high heat conductive unit.

According to one or more embodiments, a temperature difference measuring module that measures a first temperature difference and a second temperature difference, the first temperature difference and the second temperature difference being used to calculate an internal temperature of a measurement object, the temperature difference measuring module includes: a package having a bottomed tubular shape including plural leads; and a MEMS device disposed on an inner bottom surface of the package, the MEMS device including a top face and a support, the top face including a first thermopile configured to measure the first temperature difference and a second thermopile configured to measure the second temperature difference, the support supporting the top face, a plurality of cavities leading to the top face being provided in the support, an orientation in which a cold junction of each thermocouple constituting the first thermopile is viewed from a hot junction coincides with an orientation in which a cold junction of each thermocouple constituting the second thermopile is viewed from a hot junction.

For the first and second temperatures output from the temperature difference measuring module, the estimated error is not increased during the calculation of the internal temperature. Accordingly, when the internal temperature measuring apparatus is made using the temperature difference measuring module of one or more embodiments, the internal temperature measuring apparatus that is hardly susceptible to the heat flow from the heat source except for the measurement object can be obtained.

Effect of the Invention

According to one or more embodiments, the internal temperature measuring apparatus and temperature difference measuring module, which are hardly affected by the heat flow from the heat source except for the measurement object, can be made.

MODE FOR CARRYING OUT THE INVENTION

Hereinafter, embodiments will be described with reference to the drawings.

Figure 1:
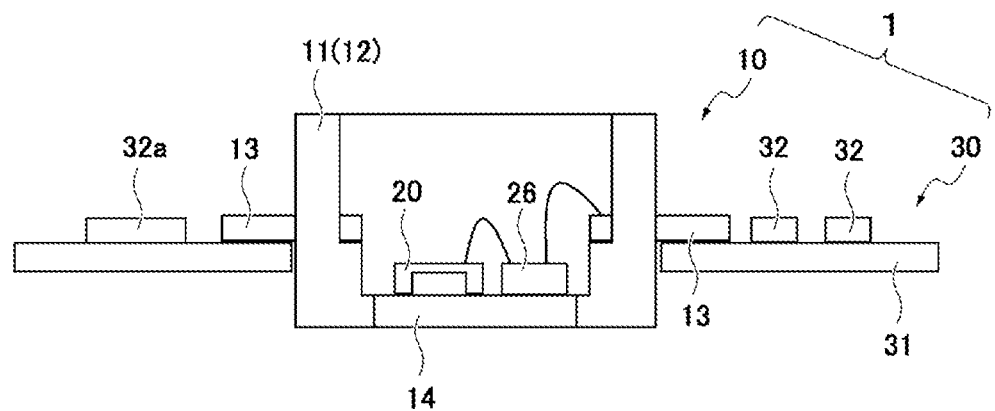
FIG. 1 is a schematic configuration diagram illustrating an internal temperature measuring apparatus according to one or more embodiments.
Figure 2:
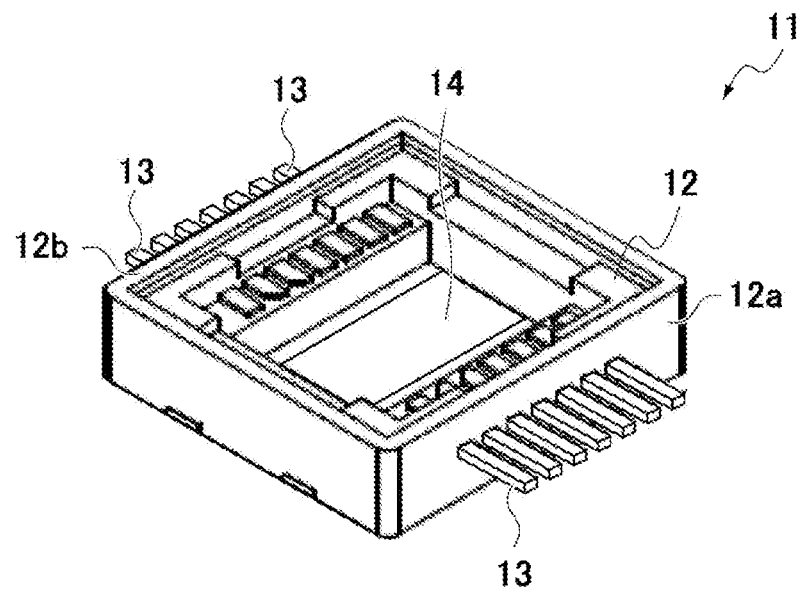
FIG. 2 is a perspective view illustrating a package used in a temperature difference measuring module of an internal temperature measuring apparatus of one or more embodiments.

First, a configuration of an internal temperature measuring apparatus 1 according to one or more embodiments will be described with reference to FIGS. 1 and 2. FIG. 1 is a schematic configuration diagram of the internal temperature measuring apparatus 1, and FIG. 2 is a perspective view illustrating a configuration of a package 11 of a temperature difference measuring module 10 included in the internal temperature measuring apparatus 1.

The internal temperature measuring apparatus 1 measures (estimates) an internal temperature of a measurement object (such as a human body) in which a non-heat generator exists near a surface of the measurement object. The internal temperature measuring apparatus 1 measures the internal temperature of the measurement object while a lower surface (a surface on a bottom side in FIG. 1) of the temperature difference measuring module 10 is in contact with the surface of the measurement object.

As illustrated in FIG. 1, the internal temperature measuring apparatus 1 has the configuration in which the temperature difference measuring module 10 is inserted in a through-hole made in a printed circuit board 30.

In the printed circuit board 30, various devices 32 (such as a resistor and a capacitor) including an arithmetic circuit 32a are mounted on a printed wiring board 31 in which the through-hole is made to insert the temperature difference measuring module 10. The arithmetic circuit 32a calculates (estimates) an internal temperature Tb of the measurement object based on three kinds of signals expressing a temperature difference $\Delta T$, a temperature difference $\Delta T'$, and a temperature Tr, which are output from the temperature difference measuring module 10. For example, a circuit that calculates the internal temperature Tb from the following internal temperature calculating equation is used as the arithmetic circuit 32a.

$$Tb = Tr + \Delta T \left( 1 + \frac{k(\Delta T' - \Delta T)}{k \cdot \Delta T' - \Delta T} \right) \quad \text{[Mathematical Formula 2]}$$

In the internal temperature calculating equation, k is a proportionality coefficient predetermined based on a shape of a MEMS chip 20 irrespective of a heat resistance of the non-heat generator existing near the surface of the measurement object.

The temperature difference measuring module 10 is one in which the MEMS chip 20 and an ASIC 26 are disposed in the package 11.

The package 11 of the temperature difference measuring module 10 has the configuration in FIG. 2. That is, the package 11 includes a casing 12 having a substantially bottomed square tube shape. In the casing 12 of the package 11, plural leads 13 are provided in each of sidewalls 12a and 12b opposite to each other with a predetermined interval to the lower surface of the casing 12 so as to pierce the sidewalls 12a or 12b. An interval between each lead 13 of the package 11 and the lower surface of the casing 12 is fixed such that the lower surface of the temperature difference measuring module 10 projects from the lower surface of the printed circuit board 30 (printed wiring board 31) when the bottom side of the temperature difference measuring module 10 is inserted in the through-hole of the printed wiring board 31.

In the bottom (hereinafter, also referred to as a casing bottom) of the casing 12, a heat transfer pad 14 made of a high heat conductive material (in one or more embodiments, metal) is disposed in a portion where the MEMS chip 20 and the ASIC 26 are disposed. The heat transfer pad 14 has the substantially same thickness as a portion except for the heat transfer pad 14 in the casing bottom.

A constituent material of each sidewall of the casing 12 is usually made of an insulating material (such as resin) having poor heat conductivity. Also, a constituent material of the portion except for the heat transfer pad 14 in the casing bottom is usually made of an insulating material having poor heat conductivity. Alternatively, a constituent material of the portion except for the heat transfer pad 14 in the casing bottom may be made of a conductive material having good heat conductivity or an insulating material having good heat conductivity.

When constituent materials of portions except for the heat transfer pad 14 of the casing 12 (portions except for each sidewall of the casing 12 and the portion except for the heat transfer pad 14 in the casing bottom) are made of the same resin, the package 11 can easily be produced by mold forming in which a metallic plate for the lead 13 (what is called a lead frame) and a metallic plate for the heat transfer pad 14 are used. Accordingly, the constituent materials of the portions except for the heat transfer pad 14 of the casing 12 are preferably made of resin.

Plural input and output electrodes are provided in a top of the ASIC 26 (FIG. 1). A temperature sensor is incorporated in the ASIC 26 to measure the temperature Tr, which is used as temperature at a predetermined portion of the MEMS chip 20. The ASIC 26 also has a function of amplifying output (the signal expressing the temperature Tr) of the temperature sensor and outputs (the signals expressing the temperature differences $\Delta T$ and $\Delta T'$) of the MEMS chip 20 and a function of digitizing each amplified output. For example, an integrated circuit including a proportional to absolute temperature (PTAT) voltage source (that is, a voltage source acting as a thermometer), which outputs voltage proportional to an absolute temperature can be used as the ASIC 26, a component of the PTAT voltage source acting as a temperature sensor.

The MEMS chip 20 used in the temperature difference measuring module 10 is a small-size device, which is produced using a micro electro mechanical systems (MEMS) technology and satisfies the following three conditions.

Condition 1: The MEMS chip 20 includes at least one first thermopile to measure the temperature difference $\Delta T$. In the first thermopile, plural thermocouples having the substantially same shape are connected in series while arrayed in parallel to each other in a direction orthogonal to a length direction of each thermocouple.

Condition 2: The MEMS chip 20 includes at least one second thermopile to measure the temperature difference $\Delta T'$. In the second thermopile, plural thermocouples having the substantially same shape are connected in series while arrayed in parallel to each other in the direction orthogonal to the length direction of each thermocouple.

Condition 3: Each thermopile (first and second thermopiles) that measures the temperature differences $\Delta T$ and $\Delta T'$ are oriented in toward the same direction when a cold junction of each thermocouple is viewed from a hot junction.

Figure 3A:
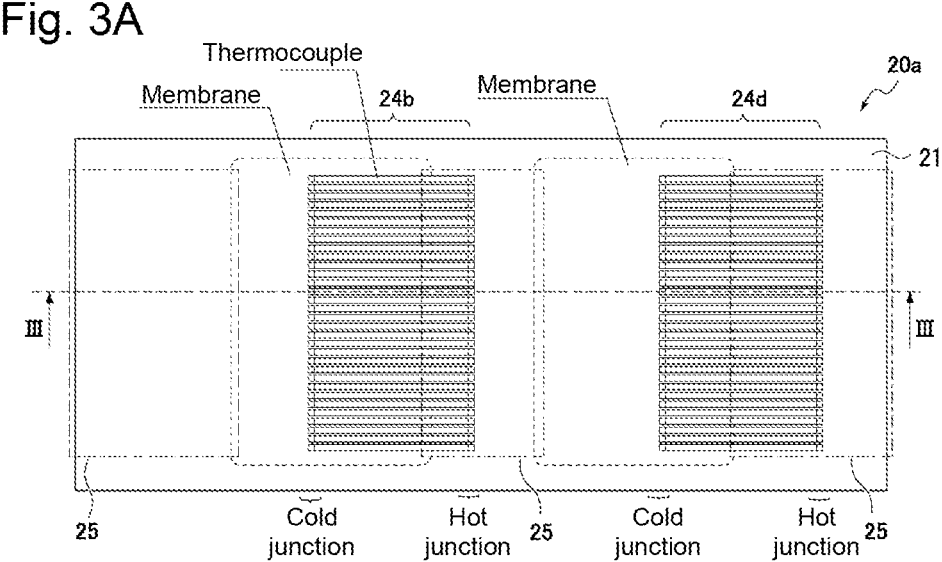
FIG. 3A is a top view illustrating a MEMS chip usable in a temperature difference measuring module.
Figure 3B:
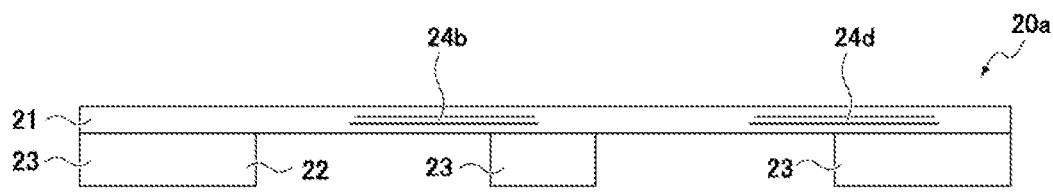
FIG. 3B is a sectional view taken on line III-III in FIG. 3A of the MEMS chip in FIG. 3A.
Figure 4A:
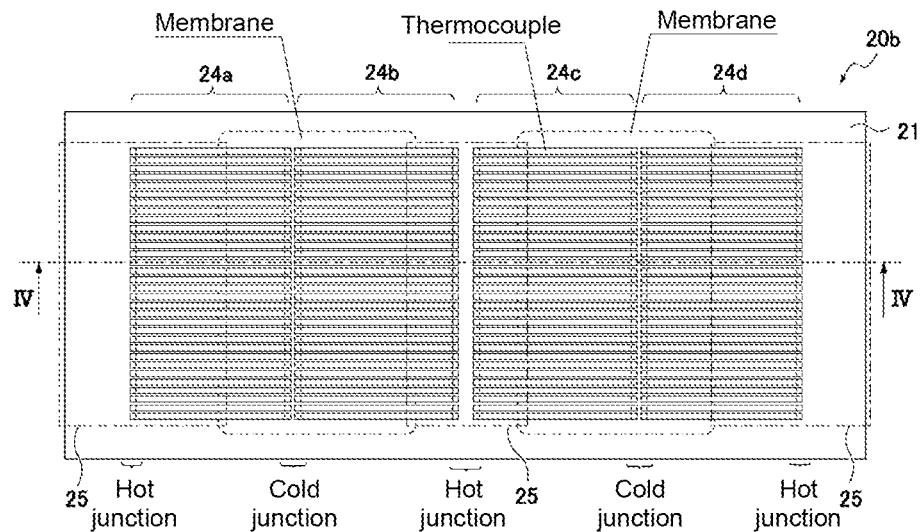
FIG. 4A is a top view illustrating a MEMS chip usable in a temperature difference measuring module.
Figure 4B:
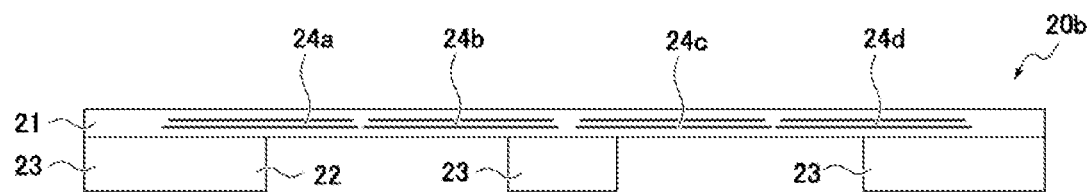
FIG. 4B is a sectional view taken on line IV-IV in FIG. 4A of the MEMS chip in FIG. 4A.

A specific example (MEMS chips 20a and 20b) of the MEMS chip 20 satisfying the conditions 1 to 3 will be described below with reference to FIGS. 3 and 4. FIG. 3A is a top view of the MEMS chip 20a, and FIG. 3B is a sectional view taken on line III-III in FIG. 3A of the MEMS chip 20a. FIG. 4A is a top view of the MEMS chip 20b, and FIG. 4B is a sectional view taken on line IV-IV in FIG. 4A of the MEMS chip 20b. In the following description about the MEMS chips 20a, 20b, the right and the left mean the right and the left in FIGS. 3A, 3B, 4A, and 4B.

As illustrated in FIGS. 3B and 4B, each of the MEMS chips 20a and 20b includes a top face 21 and a support 22.

The top face 21 is formed on a silicon substrate using various semiconductor processes (such as film forming, resist pattern forming, and etching). The support 22 is formed by etching of the silicon substrate on which the top face 21 is formed from a backside. As illustrated in FIGS. 3B and 4B, the support 22 includes plural cavities leading to the top face 21. Hereinafter, a portion of the top face 21 positioned on each cavity of the support 22 is referred to as a membrane. A portion (in the top face 21, a portion of the support 22 located below the portion that becomes a temperature measurement target with a thermopile 24) in a frame 25 indicated by an alternate long and short dash line of the support 22 is referred to as a leg 23.

As illustrated in FIGS. 3A and 3B, thermopiles 24b and 24d are provided in the top face 21 of the MEMS chip 20a. Each of the thermopiles 24b and 24d has the configuration in which the plural thermocouples having the substantially same shape are connected in series while arrayed at substantially equal intervals in parallel to each other in a direction orthogonal to a length direction of each thermocouple. The thermopiles 24b and 24d are formed in the top face 21 such that temperature difference measuring directions (the length direction of each thermocouple) of the thermopiles 24b and 24d become identical.

The hot junction and the cold junction of each thermocouple constituting the thermopile 24b are disposed on the leg 23 in the center of a horizontal direction of the MEMS chip 20a and the cavity (in the membrane on the left of the MEMS chip 20a) on the left of the MEMS chip 20a, respectively. The hot junction and the cold junction of each thermocouple constituting the thermopile 24d are disposed on the leg 23 on the right of the MEMS chip 20a and the cavity on the right of the MEMS chip 20a, respectively.

That is, the thermopiles 24b and 24d of the MEMS chip 20a are oriented toward the same direction when the cold junction of each thermocouple is viewed from the hot junction. Accordingly, the MEMS chip 20a satisfies the condition 3.

As illustrated in FIG. 3B, a width in the horizontal direction of the leg 23 on the right of the MEMS chip 20a is larger than that of the central leg 23. The hot junction of the thermopile 24b is disposed in a portion on the central leg 23 in the top face 21, and the hot junction of the thermopile 24d is disposed in a portion on the right leg 23 in the top face 21. Therefore, the temperature difference measured with the thermopile 24b and the temperature difference measured with the thermopile 24d can be used as $\Delta T$ and $\Delta T'$. That is, the MEMS chip 20a satisfies the conditions 1 and 2.

Accordingly, the MEMS chip 20a can be used as the MEMS chip 20.

As can be seen from comparison of FIGS. 4A and 3A, in the MEMS chip 20b, thermopiles 24a and 24c are added to the MEMS chip 20a. A portion in which the thermopile 24a of the MEMS chip 20b is provided has a configuration in which a portion, in which the thermopile 24d is provided, is inverted with respect to a center surface in the horizontal direction of the MEMS chip 20b. A portion in which the thermopile 24c of the MEMS chip 20b is provided has a configuration in which a portion, in which the thermopile 24b is provided, is inverted with respect to the center surface in the horizontal direction of the MEMS chip 20b.

Accordingly, the MEMS chip 20b can be used as the MEMS chip 20, in which one of the thermopiles 24a and 24c is the first thermopile while the other is the second thermopile, and the MEMS chip 20b can also be used as the MEMS chip 20, in which one of the thermopiles 24b and 24d is the first thermopile while the other is the second thermopile.

Each of the MEMS chips 20a and 20b includes one first thermopile (the thermopile that measures the temperature difference $\Delta T$) and one second thermopile (the thermopile that measures the temperature difference $\Delta T'$). Alternatively, as defined in the conditions 1 to 3, the MEMS chip 20 may include plural first and second thermopiles that measure the temperature differences $\Delta T$ and $\Delta T'$. The plural first (second) thermopiles that measure the temperature differences $\Delta T$ ($\Delta T'$) may be connected in series or parallel to each other in the MEMS chip 20, or not connected in the MEMS chip 20.

Like the MEMS chips 20a and 20b, the MEMS chip 20 satisfying the conditions 1 to 3 is used as the temperature difference measuring module 10 of the internal temperature measuring apparatus 1. In the internal temperature measuring apparatus 1, the temperature difference measuring module 10 is configured (the MEMS chip 20, ASIC 26, and lead 13 of the temperature difference measuring module 10 are connected to one another) such that the temperature differences $\Delta T$ and $\Delta T'$ measured with at least one first thermopile and at least one second thermopile of the MEMS chip 20 are used to calculate the internal temperature Tb, the first and second thermopiles being oriented toward the same direction when the cold junction of each thermocouple is viewed from the hot junction.

As described above, the internal temperature measuring apparatus 1 of one or more embodiments has the configuration in which the temperature differences $\Delta T$ and $\Delta T'$ measured with the plural thermopiles of the MEMS chip 20 satisfying the conditions 1 to 3 are used to calculate the internal temperature Tb, the plural thermopiles being oriented toward the same direction when the cold junction of each thermocouple is viewed from the hot junction. Accordingly, the internal temperature measuring apparatus 1 acts as the apparatus that can correctly calculate (estimate) the internal temperature Tb even if the heat flow flows in the MEMS chip 20 from the heat source except for the measurement object.

The reason the internal temperature measuring apparatus 1 having the above configuration acts as the apparatus that can correctly calculate (estimate) the internal temperature Tb even if the heat flow flows in the MEMS chip 20 from the heat source except for the measurement object will be described below. In the following description, the top, the bottom, the right, and the left mean the top, the bottom, the right, and the left in FIG. 4B.

In the internal temperature measuring apparatus 1, it is considered that the temperature differences $\Delta T'$ and $\Delta T$ are measured with the thermopiles 24a and 24c of the MEMS chip 20b (FIGS. 4A and 4B), respectively. In an internal temperature measuring apparatus (hereinafter, referred to as a comparison apparatus), it is considered that the temperature differences $\Delta T$ and $\Delta T'$ are measured with the thermopiles 24c and 24d of the MEMS chip 20b. It is assumed that the comparison apparatus differs from the internal temperature measuring apparatus 1 only in the connection between the MEMS chip 20b and the ASIC 26.

In the plural thermopiles 24 of the MEMS chip 20b, the plural thermocouples are vertically arrayed so as to be able to measure the horizontal temperature difference. Accordingly, the output of each thermopile 24 of the MEMS chip 20b is susceptible to a temperature gradient in the horizontal direction of the MEMS chip 20b.

The thermopiles 24b and 24d of the MEMS chip 20b are oriented toward the left when the cold junction of each thermocouple is viewed from the hot junction, and the thermopiles 24a and 24c are oriented toward the right when the cold junction of each thermocouple is viewed from the hot junction. Therefore, in the case that temperature gradient in which a left end side becomes a higher temperature side is generated by the heat flow from the heat source except for the measurement object in the MEMS chips 20b of the comparison apparatus and internal temperature measuring apparatus 1, the temperature differences measured with the thermopiles 24a and 24c increase, and the temperature differences measured with the thermopiles 24b and 24d decrease.

Accordingly, in the case that the temperature gradient is generated, the internal temperature Tb is calculated from the temperature difference ΔT larger than an original temperature difference, the temperature difference ΔT' smaller than the original temperature difference, and the temperature Tr in the comparison apparatus in which the temperature differences measured with the thermopiles 24c and 24d are used as the temperature differences ΔT and ΔT'. On the other hand, the internal temperature Tb is calculated from the temperature difference ΔT smaller than the original temperature difference, the temperature difference ΔT' smaller than the original temperature difference, and the temperature Tr in the internal temperature measuring apparatus 1 in which the temperature differences measured with the thermopiles 24a and 24c are used as the temperature differences ΔT' and ΔT. As used herein, the original temperature difference means the temperature difference that is supposed to be measured with the thermopile 24 unless the temperature gradient is generated in the MEMS chip 20b due to the heat flow from the heat source except for the measurement object.

A value (ΔT'-ΔT) is obtained during the calculation of the internal temperature Tb using the internal temperature calculating equation, and the case that the temperature difference ΔT larger than the original temperature difference and the temperature difference ΔT' smaller than the original temperature difference are used differs largely from the case that the temperature difference ΔT smaller than the original temperature difference and the temperature difference ΔT' smaller than the original temperature difference are used in an arithmetic result of the value (ΔT'-ΔT).

Specifically, for example, it is assumed that α (>0) is each of an increase caused by the influence of the heat flow from the heat source except for the measurement object in the measurement result ΔT of the temperature difference with the thermopile 24c, a decrease caused by the influence of the heat flow from the heat source except for the measurement object in the measurement result ΔT' of the temperature difference with the thermopile 24d, and an increase caused by the influence of the heat flow from the heat source except for the measurement object in the measurement result ΔT' of the temperature difference with the thermopile 24a. In this case, the value (ΔT'-ΔT), which is calculated from the measurement result ΔT of the temperature difference with the thermopile 24c and the measurement result ΔT' of the temperature difference with the thermopile 24d, is smaller than an original value by 2α. On the other hand, the value (ΔT'-ΔT), which is calculated from the measurement result ΔT of the temperature difference with the thermopile 24c and the measurement result ΔT' of the temperature difference with the thermopile 24a, is equal to the original value because α is canceled by the subtraction.

As is clear from the internal temperature calculating equation, the internal temperature Tb is not decided only by the value (ΔT'-ΔT), but is largely susceptible to the value (ΔT'-ΔT). The large deviation of the value (ΔT'-ΔT) from the original value, which is caused by the heat flow from the heat source except for the measurement object, can be prevented as described above when the temperature differences ΔT and ΔT' measured with the thermopiles, which are oriented toward the same direction when the cold junction of each thermocouple is viewed from the hot junction, in the MEMS chip 20 satisfying the conditions 1 to 3 are used to calculate the internal temperature Tb. Therefore, the internal temperature measuring apparatus 1 of one or more embodiments acts as the apparatus that can correctly calculate (estimate) the internal temperature Tb even if the heat flow flows in the MEMS chip 20 from the heat source except for the measurement object.

The effect of the internal temperature measuring apparatus 1 of one or more embodiments is qualitatively described above, and the effect was also confirmed by an experiment.

Figure 5A:
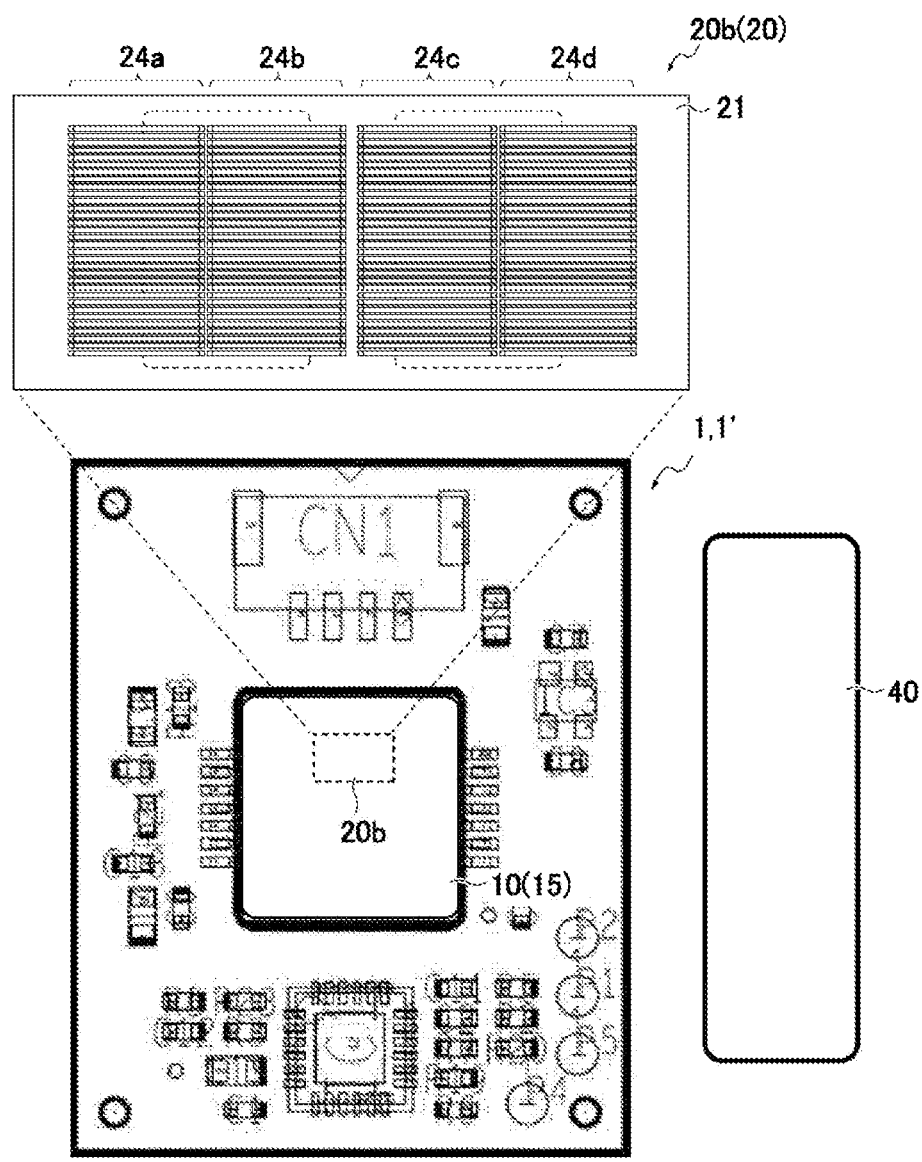
FIG. 5A is an explanatory diagram illustrating a configuration of an internal temperature measuring apparatus used in an experiment and a positional relationship between the internal temperature measuring apparatus and a cement resistor during an experiment.
Figure 5B:
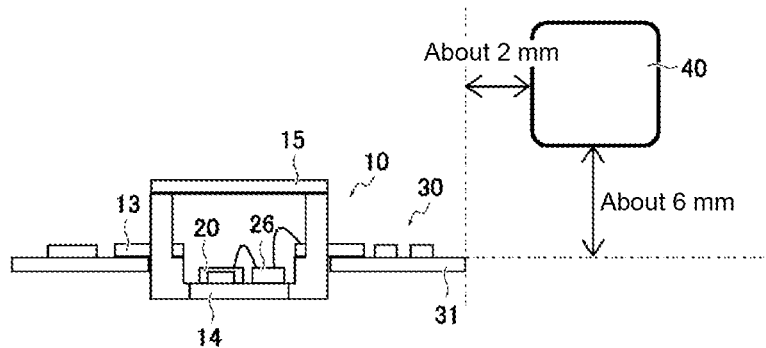
FIG. 5B is an explanatory diagram illustrating a positional relationship between an internal temperature measuring apparatus and a cement resistor during an experiment.

Specifically, the following experiment was performed on the internal temperature measuring apparatus 1 and a comparison apparatus 1', in each of which the MEMS chip 20b having the same configuration as the MEMS chip 20b used in the description was disposed in the package 11 with a certain posture of FIGS. 5A and 5B.

the internal temperature measuring apparatus 1 and the comparison apparatus 1' were disposed on a temperature-controllable stage on which a silicone rubber was placed, and a 1-kΩ cement resistor 40 was disposed at a position in FIG. 5B. The cement resistor 40 was heated by application of voltages (0 V, 2 V, 4 V), and an estimated error (a difference in calculation result between the temperature at the stage and the internal temperature Tb) of the internal temperature Tb was measured. A lid 15 in FIG. 5B closes a top surface (an upper-side opening) of the temperature difference measuring module 10 to prevent light from being incident on the temperature difference measuring module 10 from above or to prevent an upper air temperature from being changed by an air flow and the like.

Figure 6:
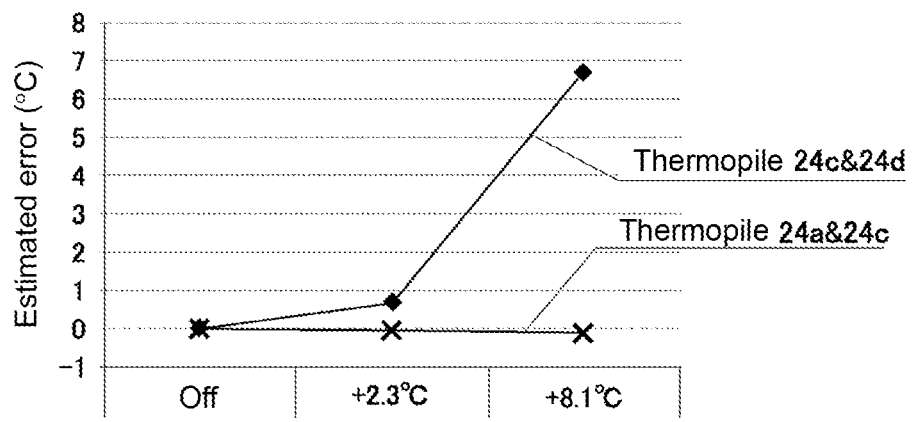
FIG. 6 is an explanatory diagram illustrating of an experimental result.

FIG. 6 illustrates an experiment result. As illustrated in FIG. 6, in the comparison apparatus 1' that calculates the internal temperature Tb from the outputs of the thermopiles 24c and 24d, the estimated error increases as the temperature increases on the right end side of the printed circuit board 30. On the other hand, in the internal temperature measuring apparatus 1 that calculates the internal temperature Tb from the outputs of the thermopiles 24a and 24c, the estimated error is small irrespective of the temperature on the right end side of the printed circuit board 30.

The above configuration can prevent the estimated error of the internal temperature Tb from increasing during the flow of the heat flow in the MEMS chip 20 (20b and the like) from the heat source except for the measurement object.

Modifications

Various modifications can be made in the internal temperature measuring apparatus 1. For example, the configuration "the temperature differences ΔT and ΔT' measured with the set of thermopiles, which is oriented toward the same direction when the cold junction of each thermocouple is viewed from the hot junction, are used to calculate the internal temperature Tb in the MEMS chip 20 satisfying the conditions 1 to 3" used in the internal temperature measuring apparatus 1 has the effect irrespective of the member on which the MEMS chip 20 is disposed. Accordingly, the internal temperature measuring apparatus 1 can be modified into an apparatus in which the MEMS chip 20 is disposed on the printed wiring board 31.

In the casing bottom, the reason the heat transfer pad 14 having the high heat conductivity is used as the portion where the MEMS chip 20 and the ASIC 26 are disposed is that the estimated error of the internal temperature Tb decreases in principle with increasing heat conductivity in a thickness direction of the casing bottom. However, depending on the shape of the MEMS chip 20, sometimes the estimated error increases because of the good heat conductivity in a cross direction (a direction perpendicular to the thickness direction) of the heat transfer pad 14. Accordingly, the casing bottom may be formed using a material having relatively poor heat conductivity without providing the heat transfer pad 14 in the casing bottom.

Figure 7A:
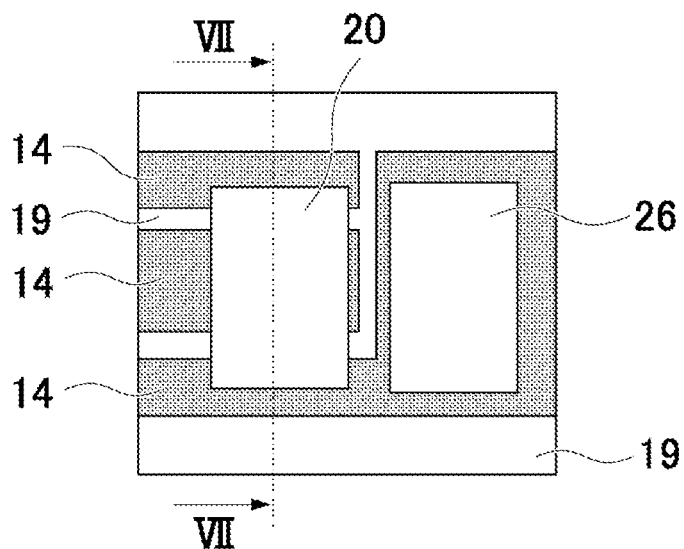
FIG. 7A is an explanatory diagram illustrating a casing bottom including plural heat transfer pads, which are separated from each other using a member having poor heat conductivity.
Figure 7B:
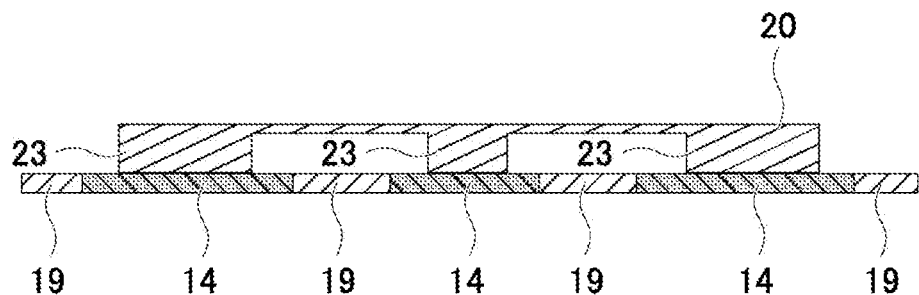
FIG. 7B is a sectional view taken on line VII-VII in FIG. 7A of the casing bottom in FIG. 7A.
Figure 8A:
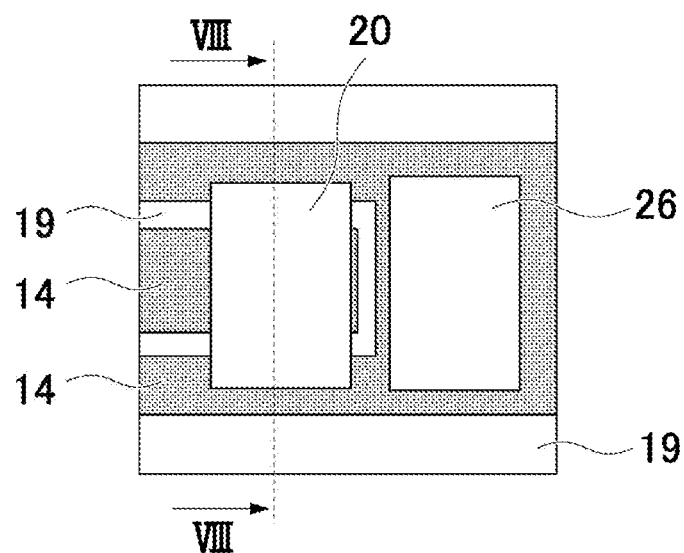
FIG. 8A is an explanatory diagram illustrating another casing bottom including plural heat transfer pads, which are separated from each other using a member having poor heat conductivity.
Figure 8B:
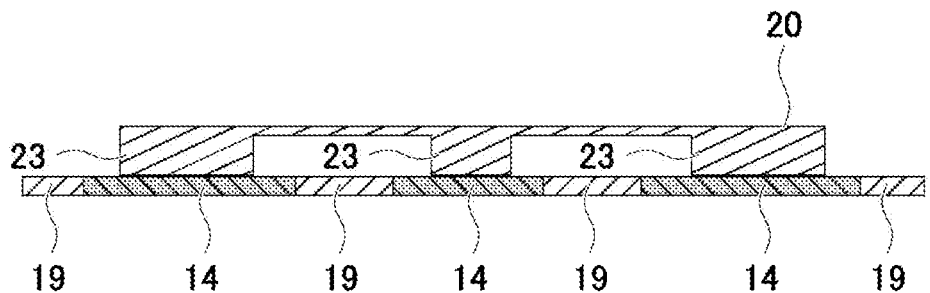
FIG. 8B is a sectional view taken on line VIII-VIII in FIG. 8A of the casing bottom in FIG. 8A.

In order to prevent the increase in estimated error caused by the heat conduction in the cross direction of the casing bottom, the casing bottom may include plural heat transfer pads 14 that are separated from each other using a material having poor heat conductivity. The casing bottom including the plural heat transfer pads 14 that are separated from each other using the material having the poor heat conductivity will specifically be described below with reference to FIGS. 7A, 7B, 8A, and 8B. FIG. 7A is an explanatory diagram (a top view in which the sidewall of the package 11 in the temperature difference measuring module 10 is not illustrated) illustrating the casing bottom including plural heat transfer pads 14, which are separated from each other using a member 19 having poor heat conductivity. FIG. 7B is a sectional view taken on line VII-VII in FIG. 7A of the casing bottom. FIG. 8A is an explanatory diagram illustrating another casing bottom including the plural heat transfer pads 14, which are separated from each other using the member 19 having the poor heat conductivity, and FIG. 8B is a sectional view taken on line VIII-VIII in FIG. 8A of the casing bottom.

In the temperature difference measuring module 10, basically it is desirable that temperature at a lower surface of a leg 23 of the MEMS chip 20 be unsusceptible to temperature at a lower surface of another leg 23 (the temperature at the lower surface of each leg 23 depends only on a heat quantity flowing from the measurement object and the air temperature above the MEMS chip 20). Accordingly, as illustrated in FIGS. 7A and 7B, the heat transfer pad 14 that is thermally separated from another heat transfer pad 14 using the member 19 having the poor heat conductivity may exist below each leg 23 of the MEMS chip 20. The reason the heat transfer pad 14 on the leg 23 of the MEMS chip 20 in FIGS. 7A and 7B extends to the portion below the ASIC 26 is that the temperature Tr measured with the temperature sensor of the ASIC 26 can be used as the temperature at the specific portion of the MEMS chip 20.

However, the temperatures at the lower surfaces of the some legs 23 may be identical (or may be preferably identical) depending on the configuration (the position of the thermopile 24 in the MEMS chip 20) of the MEMS chip 20. Accordingly, as illustrated in FIGS. 8A and 8B, some (in FIGS. 8A and 8B, one) of the plural heat transfer pads 14 provided in the casing bottom may be located below the plural legs 23.

Figure 9:
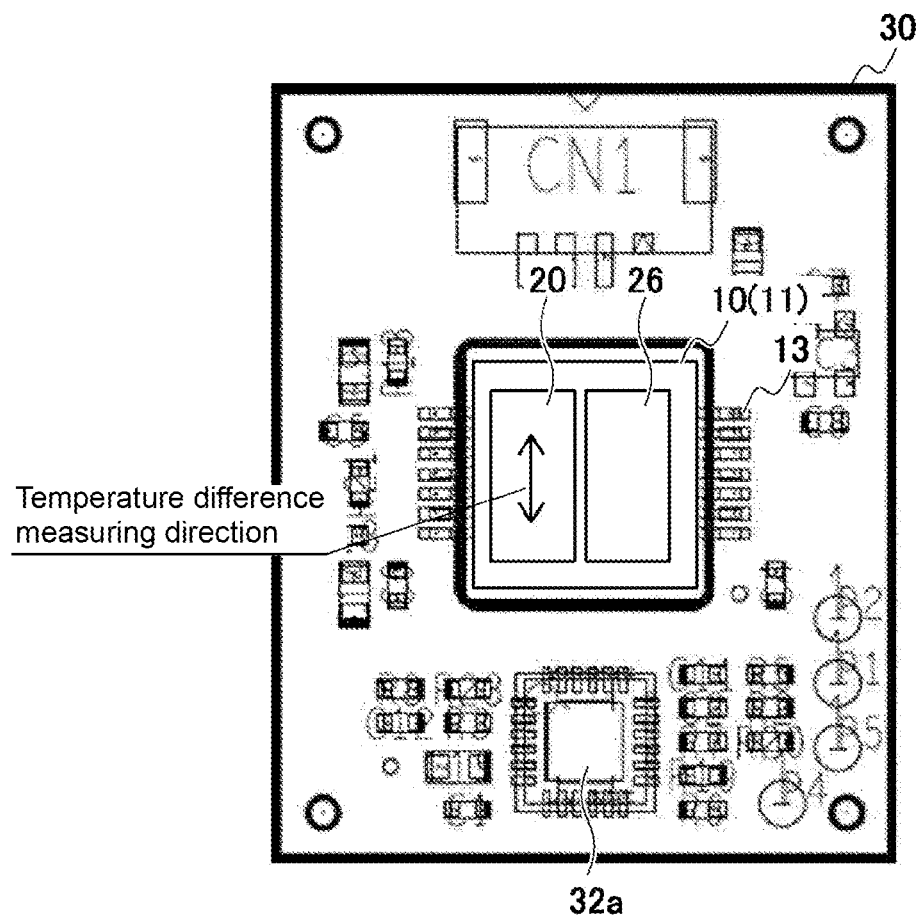
FIG. 9 is an explanatory diagram illustrating a modification of a temperature difference module.
Figure 10:
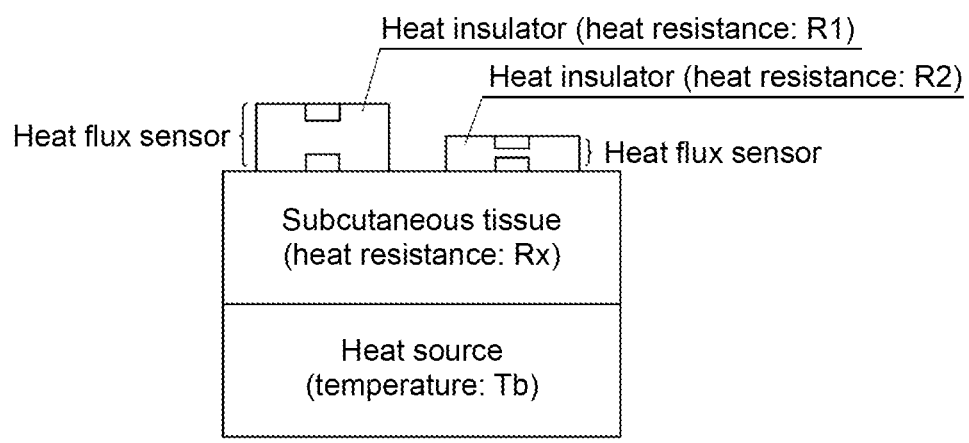
FIG. 10 is an explanatory diagram illustrating a sensor module that can measure a core body temperature without being affected by an individual difference in heat resistance of a subcutaneous tissue.

FIG. 5A illustrates the temperature difference measuring module 10, in which the MEMS chip 20 is disposed in the package 11 such that the temperature difference measuring direction (the length direction of each thermocouple of the thermopile 24) of the MEMS chip 20 is orthogonal to the surface of each sidewall on which the lead 13 of the package 11 is provided. However, there is no particular limitation to the position and posture of the MEMS chip 20 in the package 11. For example, as illustrated in FIG. 9, the MEMS chip 20 may be disposed in the package 11 such that the temperature difference measuring direction (the length direction of each thermocouple of the thermopile 24) of the MEMS chip 20 is parallel to the surface of each sidewall on which the lead 13 of the package 11 is provided. Alternatively, the MEMS chip 20 may obliquely be disposed in the package 11.

In the temperature difference measuring module 10, sensitivity is raised with decreasing air temperature above the temperature difference measuring module 10. Accordingly, a member absorbing infrared light may be provided on the bottom surface of the lid 15 in the case that the opening (top surface) of the temperature difference measuring module 10 is covered with the lid 15. A member having a shape with good heat dissipation, for example, a member including a radiation fin or a member having an area several times larger than the size of an area of the opening of the temperature difference measuring module 10 may be used as the lid 15 of the temperature difference measuring module 10.

A portion except for the bottom surface of the temperature difference measuring module 10 may be surrounded by a casing without providing the lid 15. In the casing, the member absorbing the infrared light is similarly provided in the portion above the opening of the temperature difference measuring module 10, which allows improvement of the sensitivity of the internal temperature measuring apparatus.

An inner surface of the temperature difference measuring module 10 (the package 11 and the casing 12) may be coated with a black material such as a black paint and a black resin in order that the light incident from above is prevented from being reflected by the inner surface of the temperature difference measuring module 10 and being incident on the MEMS chip 20, or in order that the air temperature is stabilized in the temperature difference measuring module 10.

In the case that the internal temperature measuring apparatus 1 is used to measure the core body temperature of the human body, an insulating film having biocompatibility and a resin member may be fixed to the bottom surface of the temperature difference measuring module 10. In order to improve thermal contact with the measurement object, the temperature difference measuring module 10 may be made such that the bottom surface of the temperature difference measuring module 10 is formed into a curved shape in which a central portion is convex downward, or such that plural convex curved structures exist in the bottom surface of the temperature difference measuring module 10.

The package 11 (casing 12) of the internal temperature measuring apparatus 1 may be formed into a different shape (such as a bottomed rectangular tube shape except for the bottomed square tube shape, a bottomed cylindrical shape, and a bottomed elliptic tube shape). The above technology is applicable in any member in which the MEMS chip 20 is disposed. Accordingly, the internal temperature measuring apparatus 1 may be modified into an apparatus (such as an apparatus in which the MEMS chip 20 is disposed on the printed wiring board 31) in which the package 11 is not used.

DESCRIPTION OF SYMBOLS

1 internal temperature measuring apparatus
10 temperature difference measuring module
11 package
12 casing
12a, 12b sidewall
13 lead
14 heat transfer pad
15 lid
20 MEMS chip
21 top face
22 support
23 leg
24, 24a, 24b, 24c thermopile
26 ASIC
30 printed circuit board
31 printed wiring board
32 device
32a arithmetic circuit

The invention claimed is:

1. An internal temperature measuring apparatus that measures an internal temperature of a measurement object, the internal temperature measuring apparatus comprising:
   a base in which a first surface is brought into contact with a surface of the measurement object during calculation of the internal temperature of the measurement object;
   a MEMS device disposed on a second surface of the base to measure a first temperature difference and a second temperature difference the MEMS device comprising:
   a top face comprising
      a first thermopile that comprises a plurality of thermocouples configured to measure the first temperature difference, and
      a second thermopile that comprises a plurality of thermocouples configured to measure the second temperature difference; and
   a support supporting the top face and comprising at least one cavity, wherein:
      each of the plurality of thermocouples of the first thermopile is oriented such that a cold junction of the thermocouple is positioned on a portion of the top face positioned on the at least one cavity and a hot junction of the thermocouple is positioned the top face; and
      each of the plurality of thermocouples of the second thermopile is oriented in a same direction as the first thermopile such that a cold junction of the thermocouple is positioned on a portion of the top face positioned on the at least one cavity and a hot junction of the thermocouple is positioned on the top face; and
   an arithmetic circuit configured to calculate the internal temperature of the measurement object based on the first temperature difference and the second temperature difference.

2. The internal temperature measuring apparatus according to claim 1, further comprising:
   a printed circuit board comprising the arithmetic circuit configured to calculate the internal temperature using the first and second temperature differences measured with the MEMS device; and
   a package having a bottomed tubular shape comprising a plurality of leads,
   wherein the package is inserted in a through-hole made in the printed circuit board, and
   the base comprises a bottom of the package.

3. The internal temperature measuring apparatus according to claim 2, wherein the bottom of the package comprises two high heat conductive units made of a first material having good heat conductivity, the two high heat conductive units being separated from each other using a material having heat conductivity lower than that of the first material, wherein
   the hot junction of each thermocouple of the first thermopile is located above one of the two high heat conductive units, and the hot junction of each thermocouple of the second thermopile is located above the other high heat conductive unit.

4. A temperature difference measuring module that measures a first temperature difference and a second temperature difference, the first temperature difference and the second temperature difference being used to calculate an internal temperature of a measurement object, the temperature difference measuring module comprising:
   a package having a bottomed tubular shape comprising a plurality of leads; and
   a MEMS device disposed on an inner bottom surface of the package, the MEMS device comprising:
   a top face comprising a first thermopile configured to measure the first temperature difference and a second thermopile configured to measure the second temperature difference; and
   a support supporting the top face and comprising a plurality of cavities, wherein:
      each thermocouple comprised in the first thermopile is oriented such that a cold junction of the thermocouple is positioned on a portion of the top face positioned on one of the plurality of cavities and a hot junction of the thermocouple is positioned on the top face; and
      each thermocouple comprised in the second thermopile is oriented in a same direction as the first thermopile such that a cold junction of the thermocouple is positioned on a portion of the top face positioned on one of the plurality of cavities and a hot junction of the thermocouple is positioned on the top face; and
   an arithmetic circuit configured to calculate the internal temperature of the measurement object based on the first temperature difference and the second temperature difference.

* * * * *